Aug. 4, 1931.  F. MAHRE  1,817,697
POWER BRUSH RAKE
Filed Oct. 25, 1927  2 Sheets-Sheet 1

Inventor
FRANK MAHRE
By R. J. Whitaker
his Attorney

Aug. 4, 1931.  F. MAHRE  1,817,697
POWER BRUSH RAKE
Filed Oct. 25, 1927  2 Sheets-Sheet 2
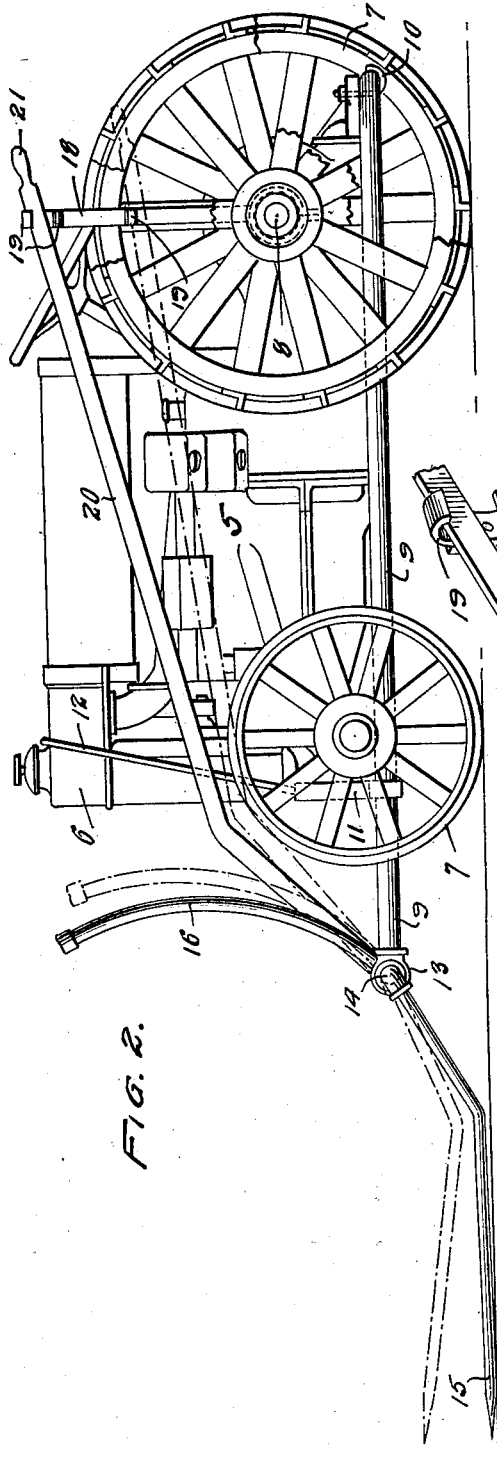
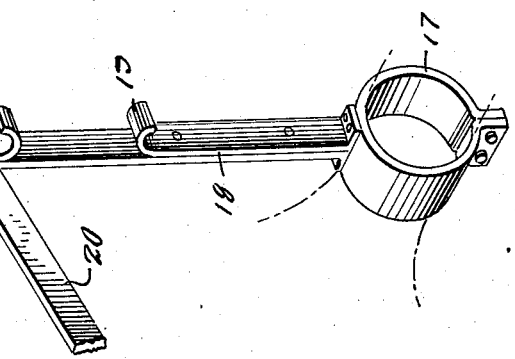
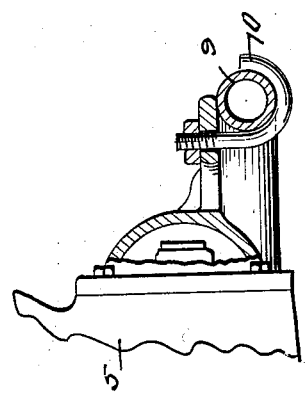
Inventor
FRANK MAHRE
By R. J. Whitaker
his Attorney Patented Aug. 4, 1931

1,817,697

UNITED STATES PATENT OFFICE

FRANK MAHRE, OF YAKIMA, WASHINGTON, ASSIGNOR OF ONE-HALF TO FRED J. MAHRE, OF YAKIMA, WASHINGTON

POWER BRUSH RAKE

Application filed October 25, 1927. Serial No. 228,516.

The invention comprises a rake attachment to a tractor of a common make and its object is to provide a simple inexpensive brush gatherer to sweep orchards after pruning. While it is particularly adapted for use in fruit growing and orchard countries it can be advantageously used to collect any kind of brush of heavy cover crop or weeds.

Another object of the invention is to provide a push rake attachment which can quickly dump the collected brush on a fire. The collecting and burning of brush after pruning is a difficult task, neither easy to handle nor accomplish no matter what gatherer is used. Twenty years experience has shown that a brush burner or a metallic sled wherein brush is picked by hand and burned as it is moved through an orchard is not only tedious, slow, and expensive, but frequently the humus or fertilizer is dragged off also.

My mechanism, after experimentation, has been found preferable to buck rakes. It is sufficiently heavy to work in orchards as distinguished from lighter rakes for hay and light field grass and a most important object is not to push the collected brush but to move to a distant space if necessary, to carry for burning.

The mechanism is easy to operate, small enough to move between the trees of any orchards and highly efficient in operation.

Other purposes and objects will be clear from a reading of the following specification and claim, taken in connection with the accompanying two sheets of drawings, wherein, Figure 1 is a top plan view of the rake attached to a tractor shown in the dash lines;

Figure 2 is a side elevation;

Figure 3 is a detail of an attaching means; and

Figure 4 is an enlarged view of my lever seating device.

The same parts are referred to by the same reference characters.

Figure 1:
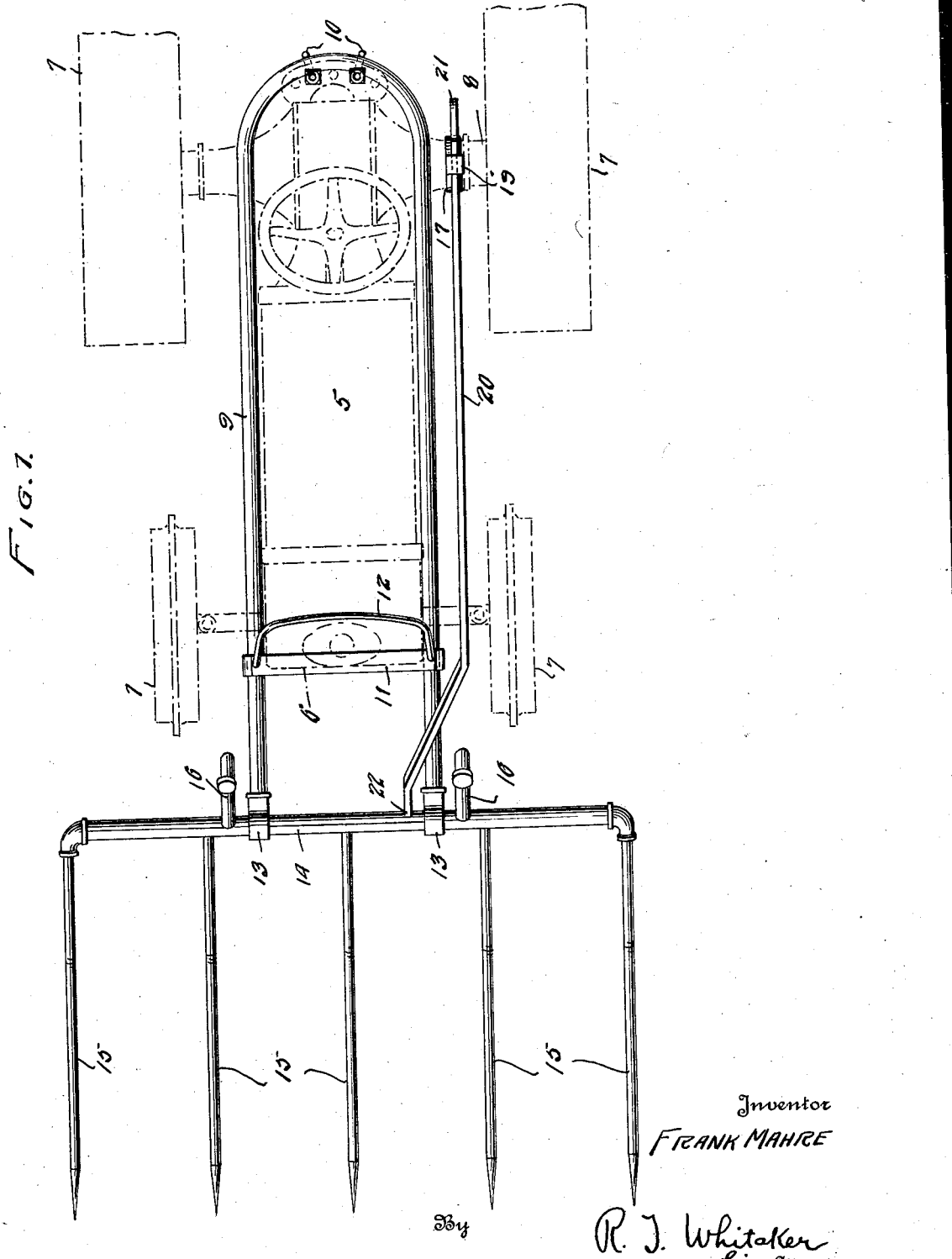

To any tractor 5, having radiator 6, wheels 7, and rear axle 8, my power brush rake is attached.

An elongated tubular U-shape supporting frame 9 is connected to the draw bar of tractor 5 by several U-bolts 10 as shown enlarged in Fig. 3. The front of the frame is held positioned by a hanger 11 depending from radiator 6; the hanger 11 being supported by a yoke 12 over the radiator.

The frame 9 is connected to eye-bolts 13 through which pass a horizontal tubular cross-member 14 of the rake or gatherer. A number of tines 15 enter said cross-member 14 to comprise the rake.

Standing upright from the cross member 14 are several guards 16 to keep the brush from the radiator 6.

Referring now to Fig. 4, a collar 17 is clamped around rear axle 8, inside of the wheel, and to a standard 18 several hooks or lever-seats 19 are formed. Into said seats an end of an elongated lever 20 is adapted to rest. This lever 20 has a handle 21 and is fixed at 22 to cross-member 14 to raise or lower the same. The several positions of the rake, tines, and lever are shown in full line and dash line positions in Fig. 2.

In operation the lever 20 is actuated to throw the rake, and tines thereof, to full line position shown in Fig. 2. The tractor then pushes the brush rake along in front of it collecting the brush. When the rake is loaded, the control lever 20 and rake is moved to the dash lined position of Fig. 2. The loaded brush is then carried to a fire for incineration and while on the fire the tractor, with tines lowered, is backed away, leaving the brush on the fire.

Clearly the rake can be connected to any tractor or power vehicle and it can be used not only for the brush of fruit trees, but is adaptable for hay or tares. An efficient operator can clear about fifteen (15) acres of land per day with my power brush rake.

It must be understood that only a preferred embodiment of my invention is herein shown and described and that any departure from the same, such as in size, shape or arrangement of parts may be resorted to without departing from the spirit of the invention or the scope of the subjoined claim.

Having thus described my invention what I claim is:

In combination, a horizontal U-shaped, tubular, supporting frame, said frame being connected to a tractor by means of U-bolts fastened to the draw bar of said tractor, means for supporting the forward end of said frame from said tractor by a yoke girdling the radiator of the tractor and a hanger depending from said tractor radiator; a transverse, horizontal tube connected to the frame and oscillatory vertically therewith, said tube having rake members and also having fixed thereon a lever, said lever being held in position by seats formed in a standard, said standard being yoked with the rear axle of the tractor; and upstanding movable guard members on said transverse horizontal tube to protect the radiator of the tractor.

FRANK MAHRE.